Oct. 24, 1967

W. S. SAUNDERS 3,348,873

MEANS FOR REDUCING LATERAL WIND RESISTANCE AND CONSEQUENT BODY SWAY AND YAW IN VEHICLES
Filed Feb. 11, 1966

INVENTOR.

W. SELDEN SAUNDERS

BY *Kimmel, Crowell & Weaver*

ATTORNEYS.

United States Patent Office 3,348,873
Patented Oct. 24, 1967

1

3,348,873
MEANS FOR REDUCING LATERAL WIND RESISTANCE AND CONSEQUENT BODY SWAY AND YAW IN VEHICLES
Walter Selden Saunders, 24 S. Chester Road,
West Chester, Pa. 19380
Filed Feb. 11, 1966, Ser. No. 526,809
11 Claims. (Cl. 296—1)

This invention relates to means for reducing lateral wind resistance and consequent body sway and yaw in vehicles, combined with means for reducing linear wind resistance to the vehicle and constitutes a continuation-in-part of my copending application Ser. No. 341,622, filed Jan. 31, 1964, entitled, "Apparatus for Reducing Linear and Lateral Wind Resistance in a Tractor-Trailer Combination Vehicle," the latter in turn constituting a continuation-in-part of my application Ser. No. 215,424, filed Aug. 7, 1962, entitled, "Device To Reduce the Air Resistance of Trucks," now abandoned.

A primary object of this invention is the provision of means of this nature which will effectively reduce the side sway or yaw of a combination vehicle such as a tractor or trailer as affected by transverse or cross wind during the forward travel of the vehicle.

An additional object of the invention is, by reducing the resistance of drag, as wall as the resistance of yaw or side sway to reduce fuel consumption, to diminish driver fatigue and enhance dynamic stability on the load, as well as reduce the horse power required to drive the vehicle at a given speed, and enable the vehicle to be driven faster and further without increase in fuel consumption so as to reduce fuel and maintenance costs.

As conducive to a clearer understanding of this invention, applicant has, in the above-mentioned copending application devised a novel and improved method of reducing linear drag in a vehicle, such as a tractor-trailer, or as pointed out in copending application Ser. No. 526,799, filed concurrently herewith now Patent No. 3,309,131 entitled, "Means for Reducing Linear Wind Resistance in Single Chassis Type Vehicles," a vehicle mounted on a single chassis. This is effected, briefly, by the provision of a shield or baffle on top of the cab of the tractor vehicle which is equal in height to approximately 0.7 times the difference between the height of the cab and the height of the trailer body, the baffle causing a relatively wide diffusion of the air impacting the forwarding portion of the trailer, and causing the same to re-adhere to the body rearwardly of the front portion in a relatively smooth and even manner, while, in the case of a trailer-tractor combination having a gap between the elements, creating a low pressure area or bubble between the tractor and the front of the trailer so that the trailer will, in effect, be pushing forward against reduced rather than increased resistance. In accordance with the instant invention, side shields, either exposed or masked are employed in conjunction with such an upstanding baffle, in such manner that the side shields or baffles offer little or no resistance to the forward passage of the tractor when traveling directly into the wind, or when the only wind pressure is occasioned by velocity, and serves to prevent influx of air around the sides and rear of the tractor into the gap between the tractor and trailer wherein the reduced air pressure circulates and eddies. A primary object of the provision of the side plate is, therefore, to preclude entrance of the air into the gap under those conditions wherein the direction of travel of the vehicle is angular in relation to the direction of the wind. Under such wind conditions, air impinging against the front of the trailer has frequently materially increased the normal yaw or side sway of the trailer to a point of danger. The provision of the angularly and rearwardly extending baffles reduces to a material extent the yaw and drag produced by such a cross wind.

Other objects of the invention reside in the combinations of elements, arrangements of parts, and features of construction, all as will be more fully pointed out hereinafter and disclosed in the accompanying drawing, wherein.

Similar reference characters refer to similar parts throughout the several views of the drawing.

Figure 1:
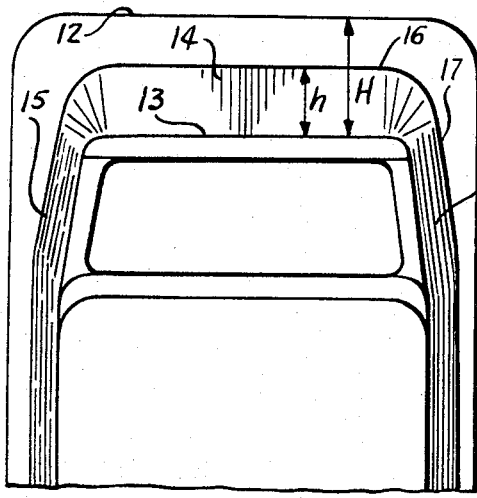
FIGURE 1 is a front elevational view of a truck comprising a tractor and trailer combination showing a vertical baffle and side shields in accordance with the instant invention.
Figure 2:
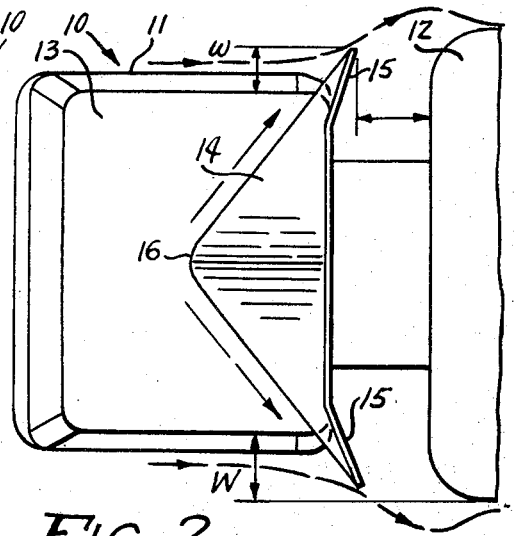
FIGURE 2 is a top plan view of the truck of FIGURE 1 showing one form of upright baffle adapted to be used in conjunction therewith.

Referring now to the drawings in detail, and more particularly to FIGURES 1 and 2, there is generally indicated at 10 a combination motor vehicle comprising a tractor 11 and a trailer 12. In this instance, the trailer is wider and higher than the roof of the cab 13 of the tractor.

In accordance with the instant invention, a baffle 14 is mounted on the roof of the tractor cab closely adjacent the rear thereof, the height of the baffle being approximately 0.7 of the difference in height between the roof of the tractor and the roof of the trailer, these distances being indicated by $h$ and $H$ respectively in FIGURE 1 and wherein $h=0.7H$.

In the illustrative embodiment shown in FIGURES 1 and 2, top shield 14 has been indicated as converging forwardly in a convexed semi-conical shape, and merging into oppositely disposed side shields 15. The top of the shield 14 is narrower, as at 16, than the lower point 17 at which it merges with the side shields 15, for a purpose to be more fully described hereinafter.

The side shields 15 add some resistance to the forward passage of the tractor alone when traveling directly into the wind, or when there is no wind, but since side shield 15 deflects the onrushing wind and prevents it from entering the gap between the tractor and trailer the air resistance on the trailer is reduced. The total resistance on the unit is reduced since the reduction in pressure on the trailer is greater than the increase in pressure on the tractor. The primary function of the side plates is, however, to preclude the entrance of air into the gap under those conditions wherein the direction of travel of the vehicle is angular to the direction of the wind. Under such wind conditions, air impinging against the front of the trailer has frequently materially increased the normal yaw or side sway of the trailer to a point of danger. The provision of the angularly and rearwardly extending baffles or shields reduces to a material extent the yaw and drag produced by such a cross wind.

Similarly, the particular shape of the baffle shown in FIGURES 1 and 2 has a beneficial effect, although a transverse straight, arcuate, convexed, or concaved baffle may be used advantageously. The employment of a baffle of the type shown in FIGURES 1 and 2 is advantageous in increasing the area of deflection on the windward side of the vehicle.

If a cross wind is blowing over the road the vehicle is traversing, a relative wind at an angle as great as, or sometimes greater, than 20° relative to the direction of travel may be encountered. At a large angle of yaw the shield or baffle 14 loses a certain amount of its ability to deflect the air around the windward side of the trailer, and a material quantity of the cross wind enters the gap between the tractor and trailer to increase the drag. This may be countered to some extent by extending the sides of the shield to the fullwidth of the trailer, but this materially reduces the effectiveness of the shield when the wind is dead ahead. As clearly pointed out in my above-mentioned copending application Ser. No. 341,622, and as proven in wind tunnel tests, the percent of drag reduction primarily depends on $h/H$, rather than on $x/W$, where $x$ represents the distance of the baffle from the forward end of the trailer body and $W$ the width of the trailer body and where $h$ equals the height of the tractor cab and $H$ the height of the trailer body. The center of the shield may therefore be moved forwardly as at 18 on the tractor roof without seriously affecting its ability to reduce drag at a zero angle of yaw. This change in shape, however, increases the deflection on the windward side up to a large angle of yaw and therefore an increase in $w/W$ is not necessary. This shield somewhat assembles a wrap-around windshield as used in the conventional automobile, and has a pleasing appearance. However, its operation is exactly the opposite of that of the conventional wrap-around windshield in that the curved and slanted conventional wrap-around windshield keeps the air separation to a minimum, while the deflecting shields 14 and 15 are shaped to provide a separation of the flow in accordance with the instant invention. The flow of air around the sides of the truck occasioned by the side baffles or shields 15 behaves in a manner similar to that over the top as discussed in the above-mentioned copending applications so that shields 15 extending downwardly along each edge of the tractor cab from a central forwardly peaked top baffle or shield 14 have been found highly desirable in this connection. It has been determined that where $w'$ equals the extension of the shield beyond the edge of the tractor $W'$ equals the width of extension of the trailer beyond the side of the tractor, most advantageous results are achieved when $w'/W'=0.7$.

The tops of the side shields are preferably merged in the smooth curve as shown in FIGURE 1 with the ends or side edges of the top baffle 14 and should be located as closely as possible to the trailer, while still permitting a full 90° maximum rotation of the tractor, and a 4-inch minimum clearance space between the tractor and trailer at any angle of rotation. The side shields 15 are inclined rearwardly at a desired angle, good results having been achieved at an angular relation of between 30 and 45°, and optimum results being achieved when the angle of inclination is approximately 38°.

It has been found that the effective distance at which the side shield or baffle deflects the air outwardly is approximately 0.7 times the difference between the side of the trailer body and the side of the cab. Similarly, the air is deflected rearwardly approximately 0.7 times the half-width of the trailer, when positioned and located as above indicated.

Thus, in a conventional tractor-trailer unit where the cab is illustratively six feet wide, the shield 15 should extend outwardly approximately 0.7 times this distance or about 8.4 inches. However, the air flowing over the roof of the cab is deflected approximately the same distance rearwardly, but since the height of the shield or baffle, as fully set forth in my copending application above-mentioned is only 0.7 times the difference in height between the tractor roof and the trailer roof and its width is only 0.7 times the half-width of the trailer, the baffle, to achieve maximum effectiveness, should be narrower at the top than at the bottom, or, in the illustrative arrangement herein given, wherein the cab is six feet wide, the top of the baffle should be approximately five feet six inches, while the bottom of the baffle, where it merges with the tops of the side shields, should be about seven feet four inches in width. Preferably the side shields should conform as closely as possible in contour to the shape of the front end of the trailer vehicle, and the overall area of the shields should be about one-half the areas of the trailer front exposed to the onrushing wind.

Figure 3:
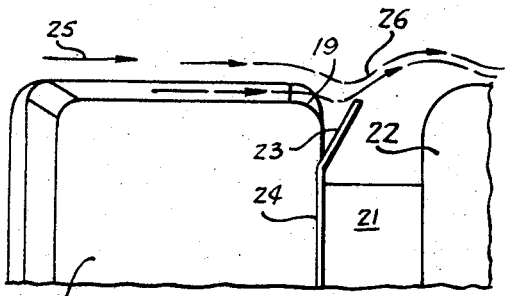
FIGURE 3 is a top plan view of a masked or recessed baffle located in the air gap between the tractor and trailer showing the action of wind thereon from dead ahead.
Figure 4:
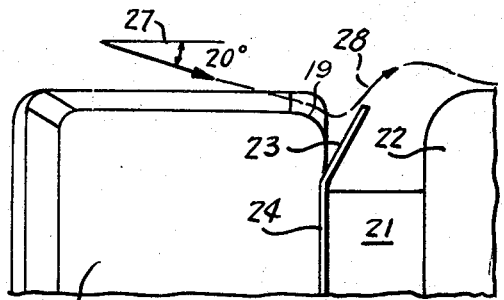
FIGURE 4 is a view similar to FIGURE 3 illustrating schematically the effect of the wind impinging on the side baffle from an angle.

A material improvement in performance may be effected by means of the structure disclosed in FIGURES 3 and 4, when, if the tractor is sufficiently wide, its body may be used to mask all or a portion of the side shield when the wind is dead ahead. In this case, a side shield may be used which is large enough to give a very material drag reduction at large angles of yaw, but which will be completely masked so that at zero yaw when the wind is dead ahead performance is completely unaffected. FIGURES 3 and 4 schematically illustrate this principle. Here the tractor vehicle 20 is provided in the gap 21 between it and its associated trailer vehicle 22 with a vertically positioned deflector plate 23, which may be merged with either a baffle of the type disclosed in FIGURES 1 and 2, or a straight horizontal baffle 24, or any other desired form of baffle. The preferred angle of declination to the rear has been found, as previously stated, to be approximately 38°. When the wind is dead ahead or the yaw angle is zero, as illustrated by the arrow 25 in FIGURE 3, the air flow is deflected as indicated at 26, the shield having thus virtually no effect on the drag of the vehicle. However, when a cross wind is blowing and the angle of yaw is 20° or less, as shown at 27 in FIGURE 4, the air flow path is as indicated at 25, where the air flows sharply around the rear corner of the tractor 28 and is deflected by the shield 23 in a manner similar to that previously described, and passes smoothly about the front of the trailer, reattaching to the sides at points rearwardly of the gap, and thereby being completely excluded from the gap.

When the tractor is a wide, or nearly as wide as the trailer, as is the case in some modern vehicles, masked side shields are effective when the wind is dead ahead, only if the rear corners of the vehicle are rounded as shown at 19 in FIGURES 3 and 4. When the wind is at an angle, however, they function as previously described to prevent air entering the gap from the side.

Figure 5:
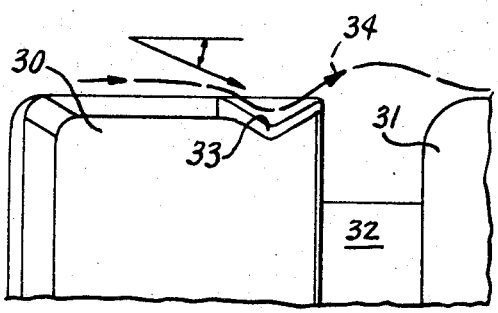
FIGURE 5 is a modified form of the invention wherein the baffle is formed integrally in the side of the tractor vehicle.

A modification of this principle is disclosed in FIGURE 5, which shows schematically the top of a tractor 30 and its associated trailer 31 having a gap 32 therebetween. In this instance the side of the tractor vehicle is formed with a vertical recess 33, which deflects the air path 34 away from the gap 32 in substantially the same manner and for the same purpose as the shield 23 previously discussed.

Such exposed side shields or masked side shields may also be advantageously employed between two trailers which are connected in a train, or in conjunction with any surface exposed to air flow in which there exists a gap. In all instances, the masked or exposed side shields preferably merge smoothly with a roof top baffle as previously set forth.

Figure 6:
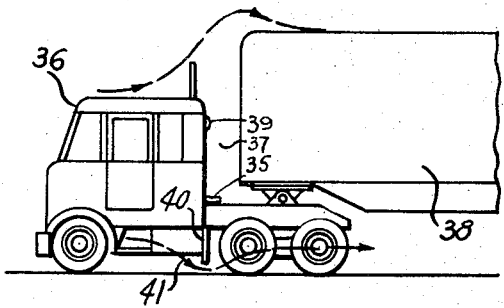
FIGURE 6 is a modified view disclosing a bottom baffle located beneath the tractor adjacent the forward edge of the gap, for a purpose to be described hereinafter.

FIGURE 6 discloses an extension of this theory. In some instances it has been found that where the exhaust 35 of a motor tractor vehicle 36 empties immediately below the gap 37 between the tractor and the trailer 38 at the bottom thereof, exhaust gases are sucked upwardly into the gap, due to the low pressure created by the aforementioned top and side baffles. Where the air intake for either the engine or the cab is located in this gap as indicated at 39, a dangerous and unsatisfactory condition sometimes exists. In certain instances the exhaust gases enter the cab, and in certain other instances they are merely recirculated through the engine so that ultimately the lack of oxygen from fresh air may actually stall the engine. This disadvantage may be readily overcome by the positioning of a small depending baffle 40 immediately adjacent the rear of the tractor vehicle, the baffle, in effect, serving to deflect air flowing beneath the tractor in a convex path as indicated by the arrows 41, completely by-passing the gap 37 and drawing the vapors from the exhaust 35 beneath the trailer body to reattach thereunder at a point spaced rearwardly of the gap.

From the foregoing, it will now be seen that there is herein provided a means for effectively reducing lateral wind resistance in a tractor-trailer combination vehicle, or a single chassis type vehicle wherein there exists a gap between the cab and the body, which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

The embodiments of the invention in which an exclusive property or privilege is claimed are defined as follows:

1. In combination with a motor vehicle including a cab and a body, with the body of a height and width greater than the width of the cab, an upright substantially solid shield positioned to extend above the top of said cab and having its lower edge in substantially air impervious relation therewith for diverting substantially the entire air flow over the top of the cab relatively widely to avoid direct contact with the front of the body, creating a relatively stable air eddy in advance of the forward end of the body, the diverted air reattaching to the body at points spaced rearwardly of the forward end in a smooth even flow, and vertical side shields on the cab extending the full height thereof, connected in substantially air impervious relation thereto, and merging smoothly with the shield extending above the cab roof to reduce side sway caused by a cross wind, said side shields being inclined rearwardly relative to the longitudinal axis of the vehicle at an angle between 30° and 45°.

2. The structure of claim 1 wherein the angle of rearward inclination is approximately 38°.

3. The structure of claim 2 wherein said side portions are of a width equal to approximately 0.7 of the difference between the half-width of the cab and the half-width of the body.

4. The structure of claim 1 wherein said vehicle is a tractor-trailer combination with said tractor including said cab and said trailer including said body, an air gap is located between said cab and said body and said air eddy is created in said gap.

5. The structure of claim 4 wherein said upright shield is of a height between 0.5 and 0.9 of the difference in height between the cab and the body, and spaced at a distance between 0.3 and 1.5 times the width of the body forwardly of the forward end of said body.

6. The structure of claim 4 wherein said upright baffle is of a width at its top less than the width of said side shields and at its bottom of a width substantially equal to the width of said side shields.

7. The structure of claim 6 wherein the half-width of the baffle at the top equals 0.7 times the half-width of the body and the width at the bottom 0.7 times the difference between the width of the cab and the width of the body.

8. The structure of claim 1 wherein said vertical side shields are inclined rearwardly from the rear wall of the cab and terminate adjacent the side edges thereof.

9. The structure of claim 8 wherein said side shields merge smoothly with the shield extending above the cab roof.

10. The structure of claim 8 wherein the angle of rearward inclination is between 30° and 45°.

11. The structure of claim 10 wherein the angle of rearward inclination is approximately 38°.

References Cited
UNITED STATES PATENTS
2,863,695   12/1958   Stamm _____ 296—1

BENJAMIN HERSH, *Primary Examiner.*

P. GOODMAN, *Assistant Examiner.*